March 19, 1929.  W. H. LINDSAY  1,705,984
FLEXIBLE COUPLING
Filed April 20, 1926  2 Sheets-Sheet 1
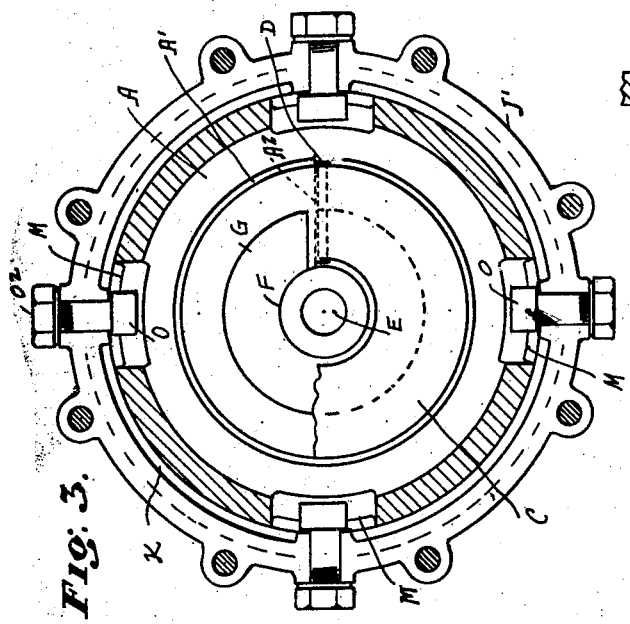
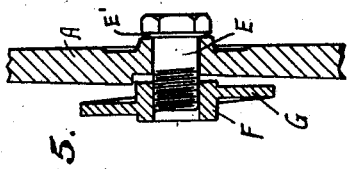
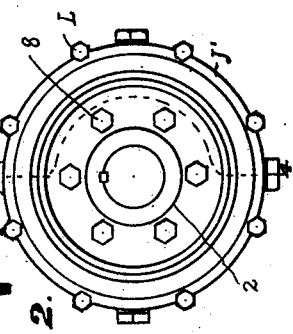
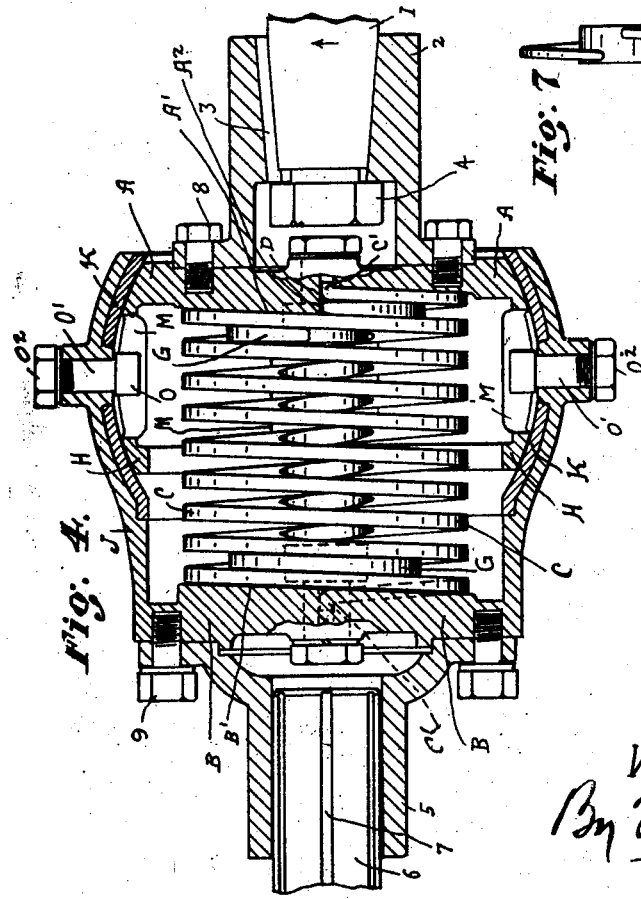
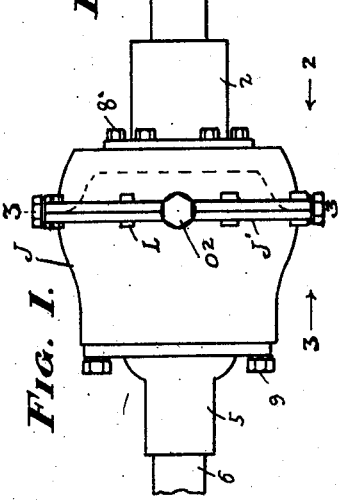
INVENTOR
WILLIAM H. LINDSAY
By Thomas L. Ryan
ATTORNEY.

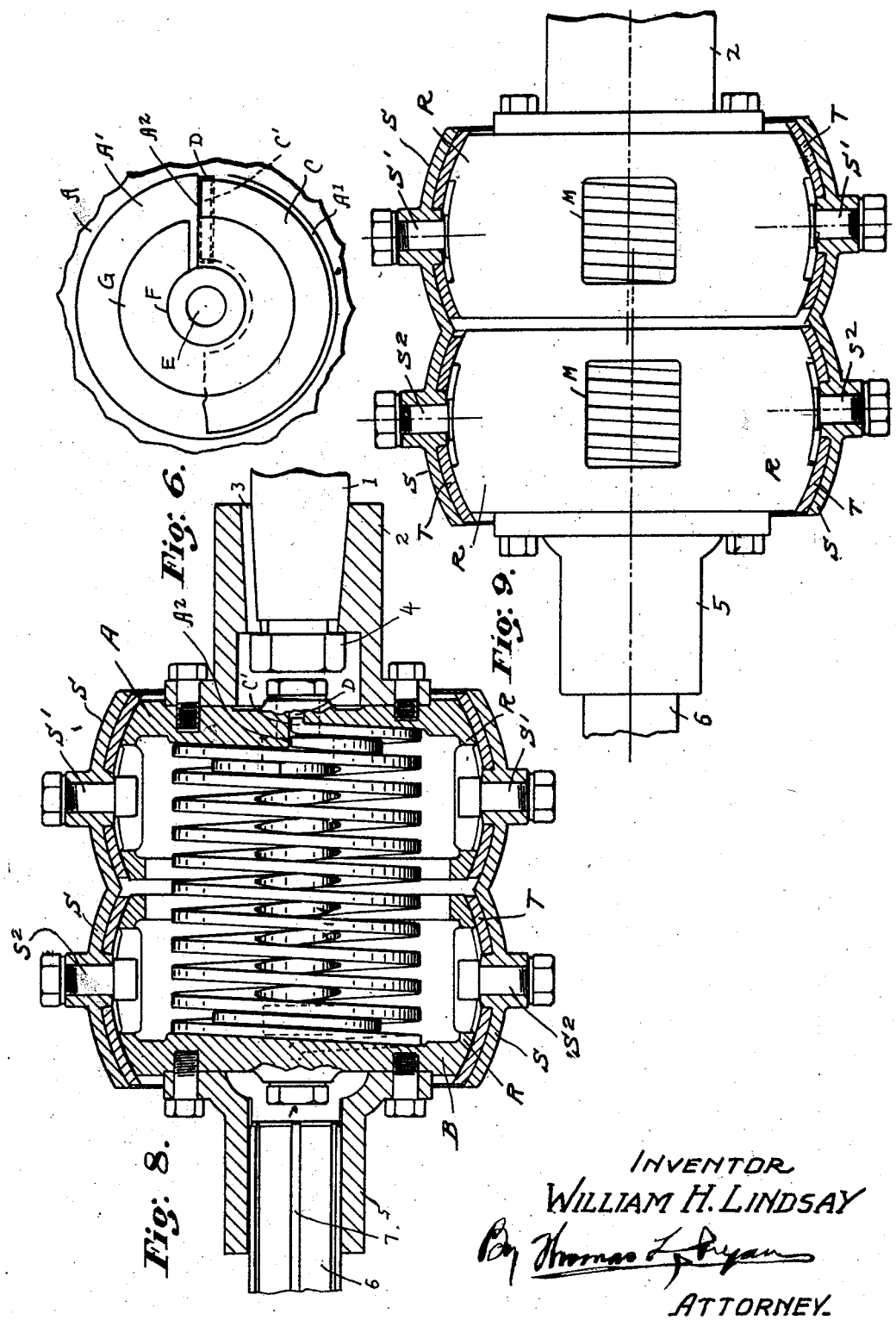

Patented Mar. 19, 1929.

1,705,984

UNITED STATES PATENT OFFICE.

WILLIAM H. LINDSAY, OF MUNCIE, INDIANA, ASSIGNOR TO L AND M MANUFACTURING & HOLDING COMPANY, OF MUNCIE, INDIANA, A CORPORATION OF INDIANA.

FLEXIBLE COUPLING.

Application filed April 20, 1926. Serial No. 103,209.

This invention relates to improvements in flexible couplings or universal joints. The present embodiment of my invention may be designated as a flexible coupling, and it is especially intended for use in the transmission of power from the automobile engine shaft, to the shaft which actuates the parts constituting the rear system.

A coupling of this type comprises a helical spring arranged as a connector between the opposed shafts. Couplings as hitherto devised upon the above principle have been so limited in their strength and capacity, that auxiliary means for reinforcing the spring have been resorted to, thus divesting it of the quality of uniform flexibility and resiliency.

The main object of my invention is to provide a coupling of the kind described, in which are attained the quality of uniform and equable flexibility, and of sturdy strength and structure to effectively withstand hard usage and the most severe strains. More specific purposes of the invention are to provide a flexible coupling which is compact, and of relatively few parts, economical of manufacture, easy to install, and which is not liable to derangement or impairment.

My invention, as shown in the present specification, is embodied in two forms of structure, one being designated as the ball type, and the other being designated as the two-ball type. The one ball type coupling is preferred for shafts that are in uniform straight alignment, and the two-ball type is preferred for shafts that are arranged in off-set alignment.

The objects of my invention are accomplished by the new construction, combination and arrangement of parts shown in the accompanying drawings, and described in the following specification. The invention is defined in the appended claims.

The several parts of the invention, as they appear in the different views in the drawings, are identified by suitable characters of reference applied thereto.

Figure 1 is a side view of my invention as embodied in the one-ball type coupling.

Figure 2 is an end view of Figure 1 as seen in the direction of the arrow 2 in Figure 1.

Figure 3 is an enlarged transverse sectional view taken on the line 3—3 in Figure 1, the helical spring being broken away in the coil that is adjacent to the grip head.

Figure 4 is an enlarged central longitudinal view taken on the line 4—4 in Figure 2.

Figure 5 is a central sectional view of the central portion of one of the shaft head-members, showing the grip head.

Figure 6 is an end view of the grip head, a portion of the helical spring being shown, to illustrate its interdigitated engagement with the helical finger of the grip head.

Figure 7 is a detail view of the grip head removed.

Figure 8 is a central longitudinal sectional view of a coupling of the two-ball type; and Figure 9 is a view of Figure 8 which shows the position occupied by the socket element, when the shafts are being operated in offset alignment.

In a flexible coupling of the present type, and in which is involved the combination and arrangement of the helical or coil spring, to operate as a power transmitting element between the driving and the driven shaft head members or ends, the problem has been to so co-ordinate and connect said parts that the power is transmitted evenly and steadily, and without liability of vibration or lost motion, or of dislocation, derangement or impairment of the spring.

Accordingly my invention contemplates the arrangement between the shaft head members of a helical spring, helically formed seats non-rotatively associated with said head members and upon which said seats, the end portions of the spring are adapted to rest, a grip head on each member, said grip head having a helically formed finger adapted to engage approximately one coil of the spring, means to draw the grip head toward the head member whereby the end portion of the helical spring is fastened or locked in non-rotative connection with the head member, and bearing elements projecting from each head member, one of said bearing elements having universal engagement with the other, and connections between the bearing elements to limit the distance of the movement of one bearing element on the other bearing element.

The driving shaft 1 is provided with the usual flanged neck member 2, which is secured by suitable means such as a key 3 and lock nut 4. The neck member 5 of the driven shaft 6 is carried non-rotatively, but free longitudinally on said shaft, by the usual splines 7.

The head members are designated as A and B, and they are adapted to be secured to the machined faces of the flanges of the necks 2 and 5 respectively, by bolts 8 and 9. Operable between these head members is a helical spring C. In the present coupling, this spring is about one quarter of an inch by one inch in cross section and is about three inches in diameter. Provided on the faces of the head members A are seats $A^1$ and $B^1$ which are formed integrally therewith. These seats are helical in formation and are adapted to receive the end coils of said spring; they are of inclines opposed to each other, the said inclines being of such degree that the end coils of the spring rest in true engagement therewith, as shown in Figure 4. At the low end of each of these helically formed seats is a recess or slot D in the head member, and at the other end is an abutment face $A^2$. Each end of said spring is bent at a right angle and constitutes a lug $C^1$ that is adapted to engage the slot D.

In a smooth central bore provided in each of the head members is arranged a draw bolt E. Adapted to engage approximately one full coil of each end of the helical spring is a grip head which is adapted to be drawn by the said draw bolt toward the head member adjacent thereto. This grip head consists of a steel forged body portion F which is provided with an integrally formed helical finger G, the central bore of said body portion having threaded engagement with the said draw bolt. The relative thickness of the body portion of said grip head is that shown in Figure 5 and in Figure 7, and the said grip heads may be inserted between the coils; then, screwing in the draw bolts E, which have lock washer E' the action of the helical fingers G is to grip the coils of the helical spring to tenacious engagement with their seats, the lugs $C^1$ occupying the radial slots D and one end of each of the fingers being at registration with the abutments $A^2$. The force exerted by the tightening of the draw bolts is of such power and effect that the end portions of the helical spring are positively gripped and secured. The direction of the incline of the coils of the helical spring, and of the incline of the helical seats, and of the threads of the draw bolts, are relatively such, that with the driver shaft operating in the direction of the arrow (as shown on shaft 1 in Figure 4) there is no tendency of the torque strains that are imposed upon the spring, to loosen the clamp or grip head connection. As a preventive of abnormal or excessive strain on the draw bolt connection in case of reverse movement of the shaft, the ends of the helical fingers G have engagement with the abutments $A^2$.

This feature of having the direction of the incline of the coils of the spring in the above named relation to the incline of the threads of the draw bolts, is an arrangement which permits of the utmost simplicity of construction of the means of tightening and fastening the grip head to the shaft-head member, and of the assembling of the several parts. For a coupling that is intended for a shaft operating in direction opposite to that indicated by the arrow, the direction of the inclines of the spring and of the bolt threads respectively, may be opposite to those shown in the drawing.

It is obvious that by the construction, combination and arrangement of parts described, there is possible the transmission of power directly from the driver shaft to the driven shaft whether in straight or irregular alignment, the end portions of the helical spring being held in positive, tenacious, and rigidly immovable non-rotative engagement with the head members, there being no possibility of vibration or lost motion.

The universal bearing elements between the said head members are of the ball and socket type, and in the present embodiment they are so arranged that they also constitute a closure or casement for the connections between the head members. Formed integral with the head member A is a ball shell H having machined semispherical external face. Formed integral with the head member B is a socket shell J provided with a boxing K with machined semispherical internal face to engage the external face of the ball shell H. The socket shell J is divided on a line substantially central of the shell H, the flanges $J^1$ being secured together by cap screws L.

A coupling constructed in accordance with my invention is of such strength that such strain as may be transmitted from the driver to the driven shaft, is so transmitted that there is only a very slight twist or torque of the spring, the latter being of the stiffness and sectional area consistent with the duty imposed upon same. As a safeguard however, and to provide means whereby power may be transmitted between the head members even if the spring should by accident become broken, I provide peripheral spaced openings M and M in the ball shell. Studs O carried by the socket shell have their shanks $O^1$ secured by the nuts $O^2$. These studs occupy positions substantially central of the openings M when the parts are assembled and are in the completed form as shown in Figures 3 and 4.

Under the most severe strains imposed, the degree of torque is estimated at not more than three to fifteen degrees. The openings M are of such dimensions as to permit of the torque movement and of the longitudinal movement of one shell on the other, without there being any contact with the studs.

In case the spring should be broken, or through defect in its texture it should be strained beyond its elastic limit, there is the engagement by the studs at the edges of the openings M, and the power is then transmitted directly through the bearing elements and the head members.

My invention is also applicable for the flexibly joining of shafts which are in offset alignment; that is to say—where one shaft is operating on an axial center, slightly removed from the axial center of the other shaft. An embodiment for this purpose, and which is designated as the two-ball type coupling, is illustrated in Figures 8 and 9. The head member A on the neck member 2 (of driving shaft 1), and the head member B on neck member 5 (of driven shaft 6), each has a ball shell R having a machined parti-spherical external face.

Adapted to embrace these ball shells R, is a shell S which comprises two socket cavities each of which is provided with a boxing T with machined internal face to engage the external face of ball shell R. Each of the two cavity portions of this shell S is divided on a line substantially central of the ball shell R, the flanges being secured together by suitable cap screws.

The head member 5 being splined and yieldable longitudinally on the shaft 6, the ball shell is free to move sufficiently to be in correct bearing engagement with the socket shell; at the same time the union of these parts is free from strain and the tension of the spring prevents vibration, and constantly compensates for all possible wear at the splines. Regardless of the direction longitudinally of the urge of the spring, the ball sockets are constantly held in such close engagement with the socket shell that the latter is held against rotative movement or shifting on the ball sockets. In case of breakage of the spring, there is then the transmission of the power of the driving shaft 1 through its head member and ball socket, and the studs S' and the socket shell S, through the studs S² and through the opposite socket shell and head member 5 to the driven shaft 6.

It will be understood that minor changes may be made in the structural formation and details of the several parts, within the scope of the invention as defined by the appended claims, without departing from the spirit of my invention or sacrificing any of its advantages.

What I claim as my invention, and desire to secure by Letters Patent, is—

1. A flexible coupling, comprising opposed head members, cooperating universal ball and socket closure shells formed integral with the said head members, a helical spring having its end portions disposed on helically formed seats that are associated with the inner faces of the head members, and having lugs reposed in recesses therefor in the head members, helically formed grip heads to engage the end portions of said spring, and means to draw the grip heads toward the head members.

2. A coupling of the kind described, comprising opposed shaft head-members, there being a recess in each of said head members, a helically formed seat approximating the length of one full coil of the spring formed integral with each head member, the ends of said seat being coincident with the sides of the recess, a helical spring having the end coils thereof to rest on said helically formed seats, the ends of said spring being turned at an angle, and adapted to engage said recesses, helically formed grip heads to engage the end coils of said spring, and means to draw the grip heads toward said head members to secure the end coils of the spring to the said helically formed seats.

3. In a coupling of the kind described, comprising opposed shaft head-members having a helical spring cooperating therebetween, a parti-spherical bearing head formed integral with one of the said shaft head-members, and having spaced circumferential slots, a divided complemental parti-spherical bearing head formed integral with the other shaft head-member and having external bearing on the first named bearing head, means to secure the said divided head in removable engagement with the first named head, and studs in said divided bearing head to engage said slots.

4. In a flexible coupling of the kind described, comprising opposed shaft head members, and a helical flat spring arranged between the head members, a helically formed seat approximating the length of one full coil of the spring associated with each head member, helical flat fingered grip heads interdigitated with end coils of the spring, and means to draw the said grip heads toward the head members.

5. In a flexible coupling, in combination with the opposed shaft head members, a helically formed seat approximating the length of one full coil of the spring formed integrally with each head member, the ends of said seat being turned at an angle to the plane thereof, a helical spring arranged between the said heads and having its ends turned at an angle to engage the low end of each seat, helical grip heads interdigitated with the spring the fingers thereof being adapted to engage the ends of said helical springs, and means to draw the grip heads toward the head members.

In testimony whereof I affix my signature.

WILLIAM H. LINDSAY.